H. W. DOVER.
HAND WHEEL.
APPLICATION FILED JULY 16, 1919.
1,331,327.
Patented Feb. 17, 1920.
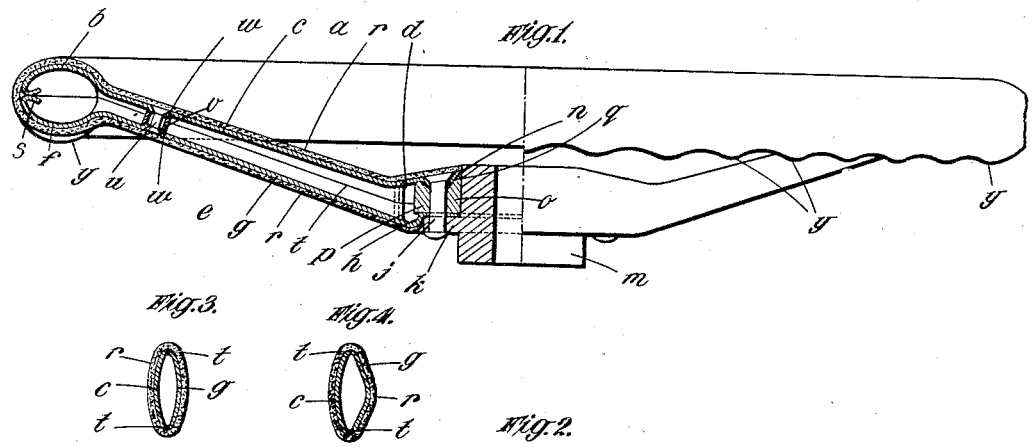
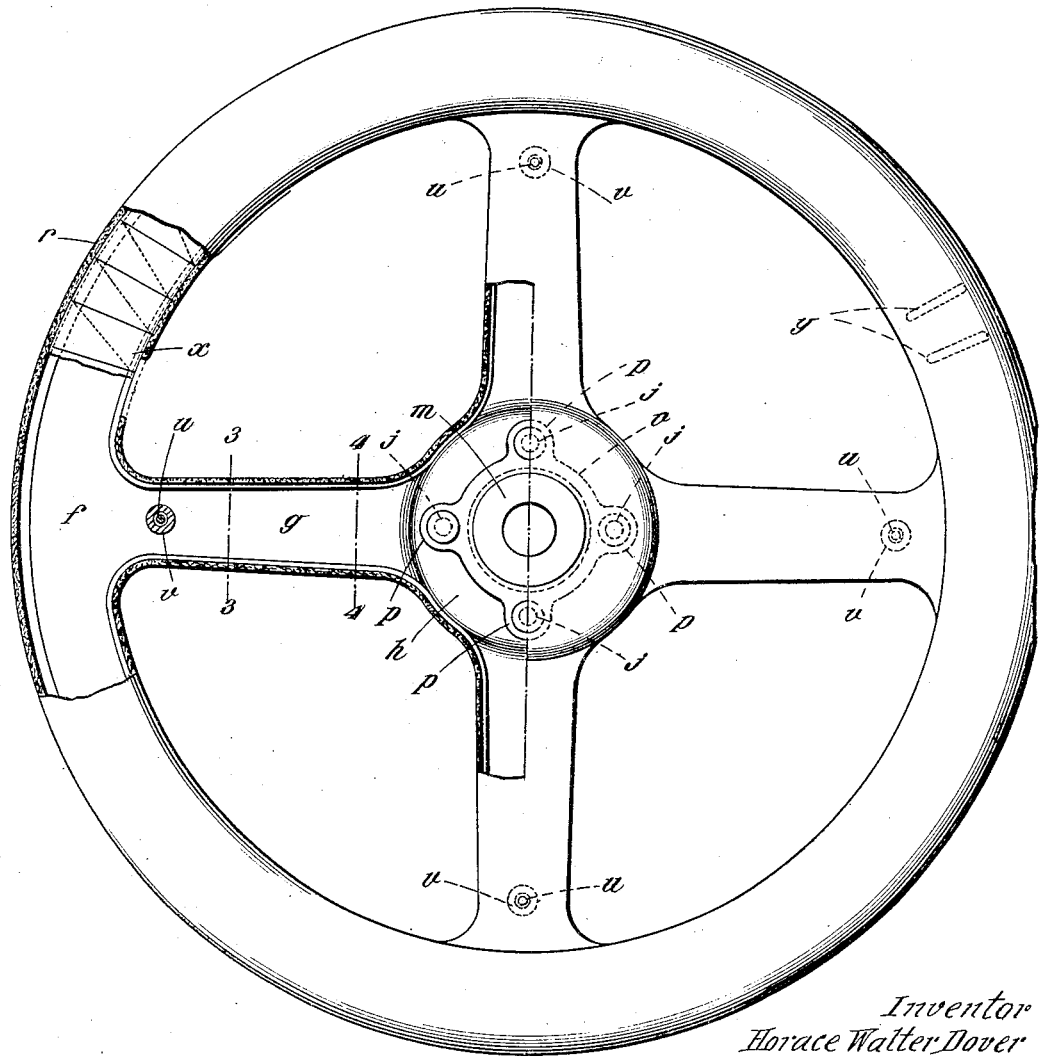
Inventor
Horace Walter Dover
By
Attorneys

UNITED STATES PATENT OFFICE.

HORACE WALTER DOVER, OF NORTHAMPTON, ENGLAND.

HAND-WHEEL.

1,331,327.  Specification of Letters Patent.  Patented Feb. 17, 1920.

Application filed July 16, 1919. Serial No. 311,160.

*To all whom it may concern:*

Be it known that I, HORACE WALTER DOVER, a subject of the King of Great Britain, and resident of Holyrood, St. James End, Northampton, in the county of Northampton, England, have invented certain new and useful Improvements in or Relating to Hand-Wheels, of which the following is a specification.

This invention which relates to hand wheels, such for instance as are employed for steering motor vehicles, for the operation of stop cocks, controlling aircraft, motor boats, gun mechanism, and for other purposes, constitutes a modification of the invention described and claimed in the specification of my prior Letters Patent No. 1,294,885.

In the preferred form of the invention described and illustrated in the specification of my said prior Letters Patent, each of the two halves of the wheel is formed with a half nave, and the complete nave portion resulting from the superposition of the one half upon the other, is secured to a flange on a hub by means of rivets, the flange being disposed between the two halves of the wheel. The object of the present invention is to provide a more rigid construction of such a wheel.

According to the present invention, the upper half of the wheel is formed of stamped or pressed sheet metal beneath which is disposed a distance piece, the hub is arranged with its flange beneath the lower half of the wheel, and the two halves of the wheel are secured to the flange by rivets passing therethrough and through the distance piece.

The lower half of the wheel may also be formed of stamped or pressed sheet metal, or the lower half of the rim, the lower part of each spoke, and the lower part of the nave of the wheel may be of cast metal, and in the latter case the distance piece may be formed in one with the lower half of the wheel.

In the accompanying drawings, Figure 1, is a side view and Fig. 2 a part plan view of one form of the improved wheel, while Figs. 3 and 4 are cross sections on the lines 3—3 and 4—4 respectively of Fig. 2. These parts of Figs. 1 and 2 which are to the right of the center line are shown in elevation and plan respectively, while those parts to the left of the same line are shown either wholly or partly in section.

$a$ is a stamping constituting the upper half of the wheel, and is formed with an annular rim-portion $b$, a plurality of half-spokes $c$, and a half nave $d$. $e$ is a stamping constituting the lower half of the wheel, and is formed with portions $f$, $g$ and $h$ corresponding respectively with the portions $b$, $c$ and $d$ of the stamping $a$, so that the two stampings, when superposed the one upon the other, together form a wheel whereof the rim is elliptical in cross section, while the upper half of each spoke portion is of semi-elliptical cross section and the lower half of each spoke portion changes from semi-elliptical to substantially V cross section as the nave of the wheel is approached.

At the inner ends, the upper and lower halves $c$ and $g_1$ of the spokes merge into the upper and lower halves $d$ and $h$ of the nave of the wheel, and at their outer ends they merge into the upper and lower halves $b$ and $f$ of the rim. The nave portions $d$ and $h$ are apertured for the passage therethrough of rivets $j$ . . . whereby the halves of the wheel are secured to a flange $k$ on a hub $m$, the nave portion $h$ being shaped to receive said flange, while the hub $m$ is shouldered as at $n$ to receive the nave portion $d$. Between the portions $d$ and $h$ is disposed an annular distance piece $o$ having lugs $p$ . . . apertured for the passage therethrough of the rivets $j$ . . . and whereof the upper surface conforms with the configuration of the nave portion $d$. The apertures through the lugs $p$ . . . are countersunk so that when the rivets $j$ . . . are closed the margins of the rivet holes in the portion $d$ are drawn into the countersunk holes in the lugs $p$ . . . as at $q$, Fig. 1, and the heads of the rivets are flush with the upper surface of the portion $d$.

After the two halves of the wheel have been assembled and the rivets $j$ . . . closed, the whole, with the exception of the hub $m$ and its flange $k$, is incased in a casing $r$ of moldable material applied according to any of the well-known methods of manufacture the casing serving the two-fold purpose of retaining the two stampings together and giving a handsome finish to the wheel.

The words "moldable material" wherever referred to in the specification and the annexed claims are intended to include material such as celluloid, exonite, or similar material, or a non-inflammable material capable of being molded in a similar manner.

If desired, the marginal parts of the rim and spoke portions in the two stampings may be inturned so as to seat the one upon the other and strengthen the structure; the marginal parts of the rim portion being shown as inturned at *s* in Fig. 1, whereas in Figs. 1, 3, and 4 the spoke portions of the two stampings are shown as butt jointed one against the other at *t*.

The outer ends of the spoke portions *c* and *g* may be united by rivets *u* . . . passing through apertured distance pieces *v* . . . Preferably, the distance pieces *v* . . . are countersunk and the portions *c* and *g* are apertured to give passage to the shank portions of the rivets *u* . . . so that when the rivets are closed the margins of the portions *c* and *g* around the rivet holes are drawn into into the countersunk holes in the distance pieces *v* . . . as at *w*, Fig. 1, and the heads of the rivets are flush with the surfaces of the portions *c* and *g*.

In some cases, the upper and lower portions of the rim or those of both the rim and the spokes, may be secured together by first wrapping them spirally with a tape *x* of linen, or other fabric, after which the covering compound or material may be applied as above mentioned.

The underside of the rim portion of the casing of the wheel may be formed, when molded, with a plurality of ribs *y* leaving indentations or finger gaps to facilitate the gripping of the wheel by the user, but I make no claim to this feature.

I claim:—

1. In a two-part hand-wheel, a stamped rim and spoke upper half; a rim and spoke lower half; a distance piece disposed between said upper and lower halves at the nave of the wheel, said upper and lower halves and said distance piece being apertured; a hub; an apertured flange on said hub, said flange being disposed beneath said lower half; rivets passing through said upper and lower halves, through said distance piece and through said flange; and a casing of moldable material around said upper and lower halves.

2. In a two-part hand-wheel, a stamped rim and spoke upper half; a stamped rim and spoke lower half; said upper and lower halves each having a centrally apertured nave portion; an annular distance piece disposed between said upper and lower halves at the nave of the wheel, the nave portions of said upper and lower halves and said annular distance piece each having a series of apertures therethrough; a hub extending through the central apertures in the nave portions of said upper and lower halves, and through said annular distance piece; a flange on said hub having a series of apertures therethrough, the centrally apertured nave portion of said lower half seating on said flange; rivets passing through the series of apertures in said upper and lower halves, in said distance piece, and in said flange; and a casing of moldable material around said upper and lower halves.

3. In a two-part hand-wheel, a stamped rim and spoke upper half; a rim and spoke lower half; a distance piece disposed between said upper and lower halves at the nave of the wheel, said upper and lower halves and said distance piece being apertured, the apertures in said distance piece being countersunk at the upper side of the latter; a hub; an apertured flange on said hub, said flange being disposed beneath said lower half; rivets passing through said upper and lower halves, through said distance piece and through said flange; the marginal portions of said upper half around the apertures therein being pressed down into the countersunk apertures at the upper side of said distance piece; and a casing of moldable material around said upper and lower halves.

4. In a two-part hand-wheel, a stamped rim and spoke upper half; a stamped rim and spoke lower half; the spoke portions of said halves being apertured near their outer ends and said upper and lower halves each having a centrally apertured nave portion; an annular distance piece disposed between said upper and lower halves at the nave of the wheel, the nave portions of said upper and lower halves and said annular distance piece each having a series of apertures therethrough; a hub extending through the central apertures in the nave portions of said upper and lower halves, and through said annular distance piece; a flange on said hub having a series of apertures therethrough, the centrally apertured nave portion of said lower half seating on said flange; rivets passing through the series of apertures in said upper and lower halves, in said distance piece, and in said flange; apertured distance pieces disposed in the spoke portions of the wheel between said upper and lower halves; rivets passing through the apertures in said spoke portions and in the last-mentioned distance pieces; and a casing of moldable material around said upper and lower halves.

5. In a two-part hand-wheel, a stamped rim and spoke upper half; a stamped rim and spoke lower half; the spoke portions of said halves being apertured near their outer ends and said upper and lower halves each having a centrally apertured nave portion; an annular distance piece disposed between said upper and lower halves at the nave of the wheel, the nave portions of said upper and lower halves, and said annular distance piece each having a series of apertures therethrough, and the apertures in said distance piece being countersunk at the upper side of the latter; a hub extending through the central apertures in the nave portions of said upper and lower halves, and through said annular distance piece; a flange on said hub having a series of apertures therethrough, the centrally apertured nave portion of said lower half seating on said flange; rivets passing through the series of apertures in said upper and lower halves, in said distance piece, and in said flange, the marginal portions of the upper half around the series of apertures therein being pressed down into the countersunk apertures at the upper side of the distance pieces; heads on said rivets said heads being flush with the upper surface of said upper half; apertured distance pieces disposed in the spoke portions of the wheel between said upper and lower halves, the apertures in the last mentioned distance pieces being countersunk; rivets passing through the apertures in said spoke portions and in the last mentioned distance pieces, the marginal portions of the upper and lower halves around the apertures in the spoke portions thereof being pressed into the countersunk apertures in the last mentioned distance pieces; heads on the last mentioned rivets said heads being flush with the surfaces of the respective spoke portions of the upper and lower halves; and a casing of moldable material around said upper and lower halves, substantially as set forth.

HORACE WALTER DOVER.